United States Patent
Doubrava et al.

(10) Patent No.: US 8,411,053 B2
(45) Date of Patent: Apr. 2, 2013

(54) DUAL PEN INTERACTIVE WHITEBOARD SYSTEM

(75) Inventors: Dana Gene Doubrava, Phoenix, AZ (US); Mark Edward Plasterer, Ellicott City, MD (US); David Eric Timmons, Dunedin, FL (US); Richard Wiley Prugh, Darnestown, MD (US)

(73) Assignee: eInstruction Corporation, Denton, TX (US)

( * ) Notice: Subject to any disclaimer, the term of this patent is extended or adjusted under 35 U.S.C. 154(b) by 712 days.

(21) Appl. No.: 12/640,017

(22) Filed: Dec. 17, 2009

(65) Prior Publication Data

US 2010/0156831 A1 Jun. 24, 2010

Related U.S. Application Data

(60) Provisional application No. 61/193,716, filed on Dec. 18, 2008.

(51) Int. Cl.
*G06F 3/033* (2006.01)
(52) U.S. Cl. ......... 345/173; 345/156; 345/179; 345/158
(58) Field of Classification Search .................. None
See application file for complete search history.

(56) References Cited

U.S. PATENT DOCUMENTS

| | | | |
|---|---|---|---|
| 4,206,314 A | 6/1980 | Prugh et al. | |
| 4,423,286 A | 12/1983 | Bergeron | |
| 5,341,155 A * | 8/1994 | Elrod et al. | 345/179 |
| 6,116,707 A * | 9/2000 | Avida | 346/139 R |
| 6,930,673 B2 | 8/2005 | Kaye et al. | |
| 7,679,607 B2 * | 3/2010 | Shi | 345/173 |
| 8,054,301 B2 * | 11/2011 | Pearce et al. | 345/179 |
| 2005/0219204 A1 * | 10/2005 | Huddleston et al. | 345/156 |
| 2005/0264541 A1 * | 12/2005 | Satoh | 345/173 |
| 2009/0295723 A1 * | 12/2009 | Oakley et al. | 345/158 |
| 2010/0289741 A1 * | 11/2010 | Pearce et al. | 345/157 |

* cited by examiner

*Primary Examiner* — Van Chow
(74) *Attorney, Agent, or Firm* — Manelli Selter PLLC; Edward J. Stemberger

(57) ABSTRACT

An electromagnetic interactive whiteboard system includes a first electronic pen (16) constructed and arranged to operate at a first frequency (F1). At least a second electronic pen (18) is constructed and arranged to operate at a second frequency (F2) that is different from the first frequency. An electromagnetic interactive whiteboard (12) has a single conductive grid (14) constructed and arranged to receive electromagnetic signals from the pens due to proximity of the pens to the grid. A circuit (30) separates the first and second frequencies into their respective X and Y component frequencies when the pens are operating simultaneously. A controller (20) receives a signal including the separated X and Y component frequencies of each of the first and second pens to detect each pen and to determine an X and Y coordinate position of each pen relative to the grid based on the X and Y component frequencies.

19 Claims, 3 Drawing Sheets

DUAL PEN INTERACTIVE WHITEBOARD SYSTEM

This application claims the benefit of the earlier filing date of U.S. Provisional Application No. 61/193,716, filed on Dec. 18, 2008, which is hereby incorporated by reference into this specification.

TECHNICAL FIELD

The embodiment relates to electromagnetic interactive whiteboards typically used in classrooms, and more particularly, to an electromagnetic interactive whiteboard that allows at least two electronic pens to be used at the same time.

Electromagnetic interactive whiteboards are being used more often in classroom settings to enhance the educational experience. These whiteboards have a conductive grid connected to an electronic controller. The whiteboard electronic controller receives electromagnetic signals from electronic pens via the conductive grid. The electronic controller is tuned to the frequency of the electronic pens in order to detect and "see" the electronic pens. The controller can then determine the precise X and Y position of the pen relative to the grid.

Currently, standard electromagnetic interactive whiteboards have electronic pens that operate at a common frequency, as such, all pens look the same to the board and only a single user can use the board.

Thus, there is a need to provide an electromagnetic interactive whiteboard system that allows at least two electronic pens to be used on the electromagnetic interactive whiteboard allowing multiple students to utilize the whiteboard at the same time.

SUMMARY

An object of the invention is to fulfill the needs referred to above. In accordance with an embodiment of the invention this objective is fulfilled by an electromagnetic interactive whiteboard system including a first electronic pen constructed and arranged to operate at a first frequency. At least a second electronic pen is constructed and arranged to operate at a second frequency that is different from the first frequency. An electromagnetic interactive whiteboard has a single conductive grid constructed and arranged to receive electromagnetic signals from the pens due to proximity of the pens to the grid. A circuit separates the first and second frequencies into their respective X and Y component frequencies when the pens are operating simultaneously. A controller is constructed and arranged to receive a signal including the separated X and Y component frequencies of each of the first and second pens to detect each pen and to determine an X and Y coordinate position of each pen relative to the grid based on the X and Y component frequencies.

In accordance with another aspect of an embodiment, a method provides an interactive whiteboard system that includes at least first and second electronic pens. An electromagnetic interactive whiteboard is provided and has a single conductive grid constructed and arranged to receive electromagnetic signals from the pens due to proximity of pens to the grid. The method ensures that a coordinate position of each pen with respect to the grid can be determined while the pens are operating simultaneously.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DESCRIPTION OF AN EXAMPLE EMBODIMENT

Figure 1:
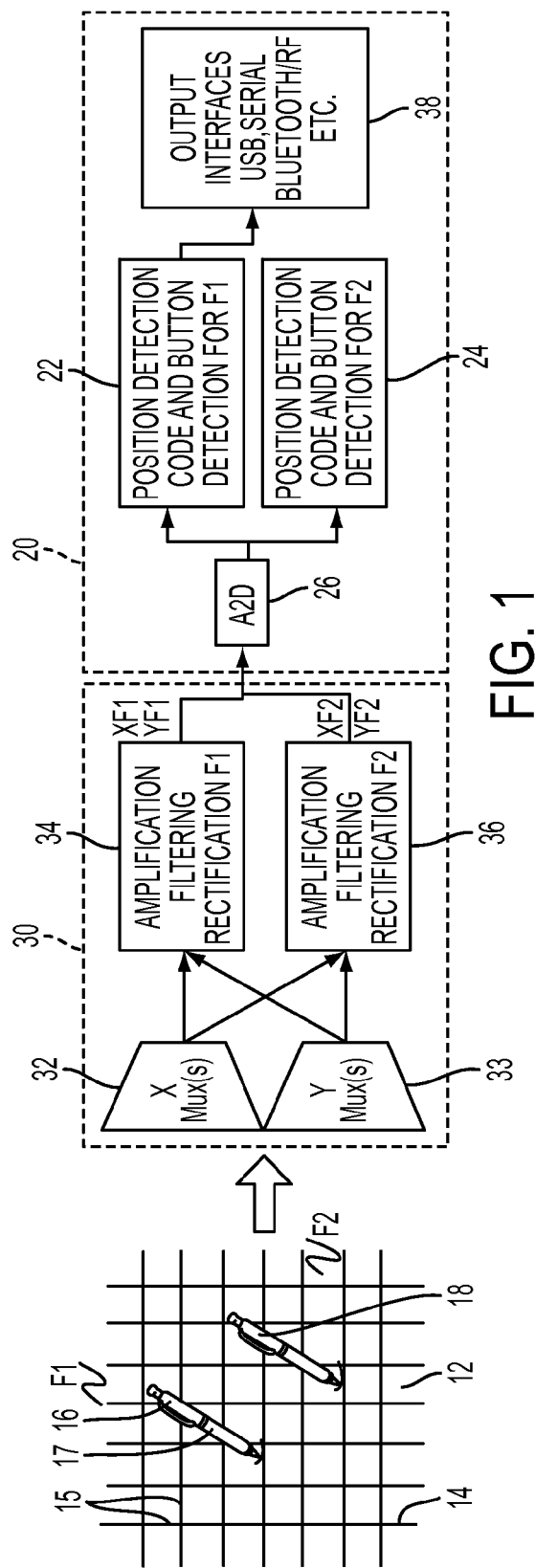
FIG. 1 is a block diagram of a dual pen electromagnetic interactive whiteboard system provided in accordance with a first embodiment.

With reference to FIG. 1, an embodiment of a dual pen electromagnetic interactive whiteboard system is shown, generally indicated at 10. The embodiment utilizes advancements in electronics to create a dual frequency electromagnetic interactive whiteboard system 10. The system 10 includes an electromagnetic interactive whiteboard 12, preferably, an INTERWRITE®BOARD manufactured by eInstruction Corporation. The whiteboard 12 has a single conductive grid 14 that receives electromagnetic signals from electronic pens 16, 18 for determining the X and Y position of each pen. In particular, the whiteboard 12 is of conventional electromagnetic coupling type in which detecting lines 15 are arranged in X and Y directions, respectively. The whiteboard 12 detects changes in the signal levels of the detecting lines due to a magnetic field of pens 16, 18 to thereby detect position of the pens 16, 18, when the pens are in proximity to the input surface of the whiteboard 12. The pens 16, 18 are preferably wireless and communicate with the whiteboard 12 via an electromagnetic wave that is received by a detection circuit of the whiteboard 12 in the conventional manner. Although a whiteboard 12 is disclosed, any electromagnetic digitizer can be employed with the pens, such as a graphics tablet or pad.

The grid 14 is electrically connected in a wired manner to an electronic controller 20 of the system 10 through one or more Application Specific Integrated Circuit (ASIC) 30, which will be explained more fully below. The ASIC 30 receives the electromagnetic signals from the electronic pens 16, 18 via the conductive grid 14. The ASIC 30 is tuned to the frequency of each electronic pen in order to detect and "see" each electronic pen. The controller 20 receives signals from the ASIC 30 and can then determine the precise X and Y position of each pen relative to the grid 14.

The pens 16 and 18 are preferably wireless for ease of use. Although two pens 16, 18 are shown, it can be appreciated that more than two pens can be used in the system 10. The pens 16 and 18 and whiteboard 12 are similar to those used in the system of the type disclosed in U.S. Pat. No. 6,930,673, the content of which is hereby incorporated by reference into this specification. However, in order for at the least two electronic pens 16 and 18 to be used at the same time, in accordance with the embodiments, pen 16 operates at a frequency F1 and pen 18 operates at a frequency F2, which is different from frequency F1. Pen 16 can have a visual marking or indicator 17 for identification so as to let the user know that the pen 16 has a different frequency than pen 18.

Thus, the controller 20 includes at least two frequency detection schemes separated by a specific value to avoid interference. More particularly, circuit 22 provides the X and Y coordinate conversion of F1 and circuit 24 provides the X and Y coordinate conversion of frequency F2. If more than two pens are used, another circuit (not shown) can provide the X and Y coordinate conversion of frequencies Fn. In this manner, a single conductive grid 14 can be used to detect multiple pens. The controller 20 can determine the position of each pen in any conventional manner such as, for example, the manner disclosed in U.S. Pat. No. 4,423,286, the content of which is hereby incorporated by reference into this specification. If the pens 16 and 18 have conventional button operation, the controller 20 detects the operation of the button(s) on the associated pen.

Advancements in electronics allow Application Specific Integrated Circuits (ASICs) to be used to implement the dual frequency approach in a very cost effective manner. Multiple frequency pens are implemented in the embodiment in this fashion. For cost and usability reasons, the preferred embodiments use a two frequency implementation allowing two users (pens) to simultaneously use the whiteboard 12.

In one embodiment, the system 10 includes an ASIC 30 having an X component multiplexer 32 that receives the signals having the frequencies F1 and F2 from the grid 14 that indicate a corresponding X position of each pen with respect to the grid. In addition, the ASIC 30 has a Y component multiplexer 33 that receives the signals having the F1 and F2 from the grid 14 that indicate a corresponding Y position of each pen with respect to the grid. Amplification and filter structures 34 and 36 are used to separate the multiple pen frequencies F1, F2, . . . Fn into their corresponding X and Y component frequencies (e.g., XF1, YF1; XF2, YF2, . . . ) for input into the controller 20. The signals are converted to digital signals via A/D converter 26. The controller 20 then provides the X and Y coordinate conversion of the component frequencies corresponding to F1 and F2 via the circuits 22 and 24, respectively, as noted above.

Figure 2:
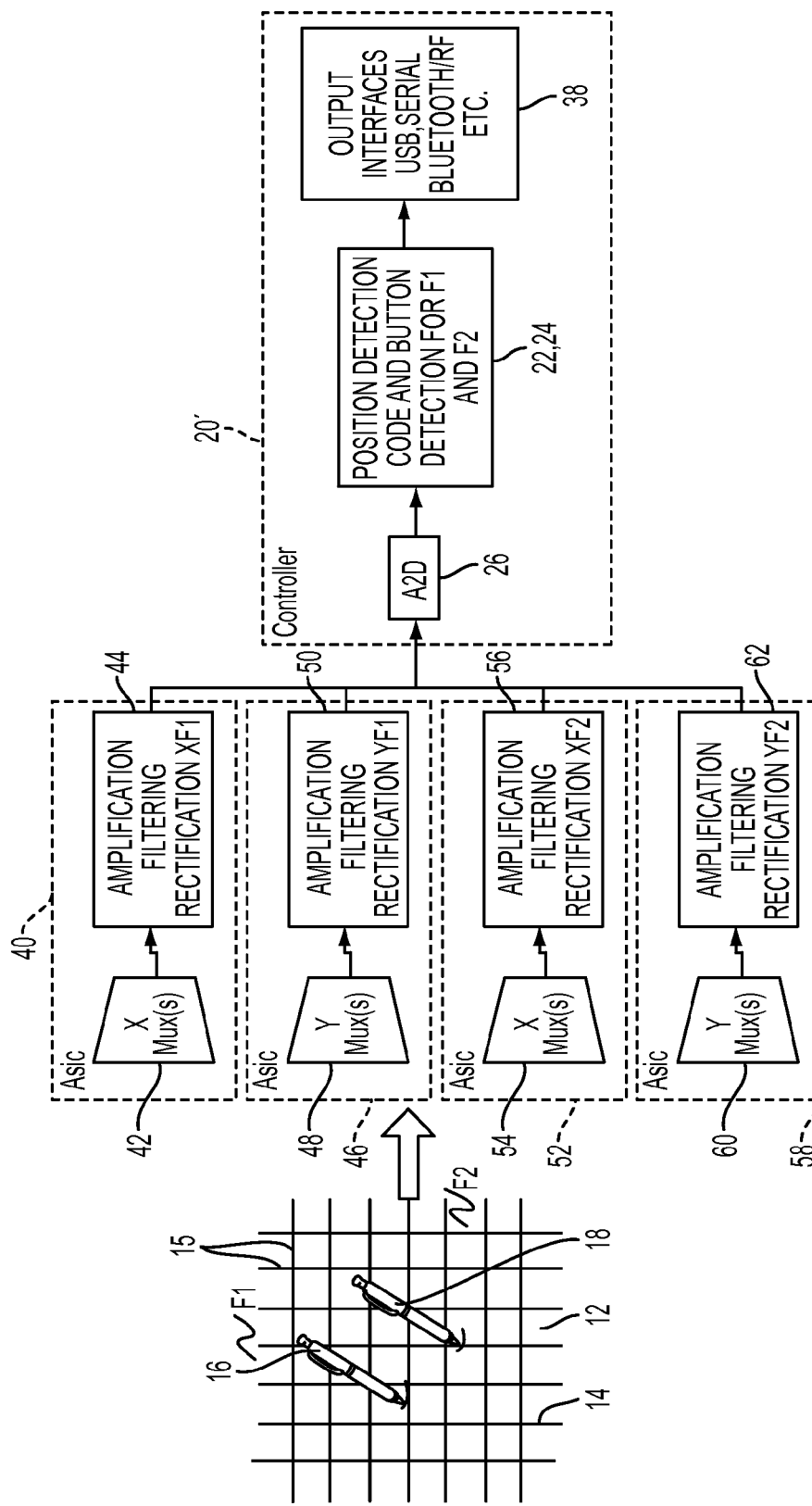
FIG. 2 is a block diagram of a dual pen electromagnetic interactive whiteboard system provided in accordance with a second embodiment.
Figure 3:
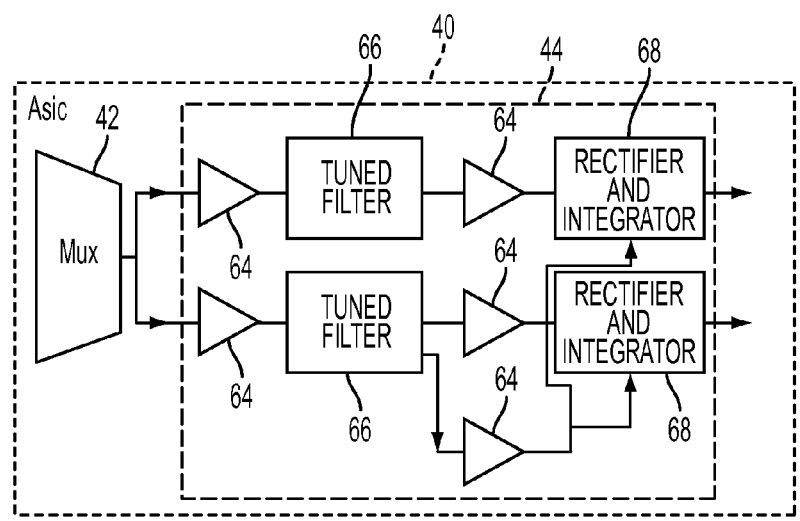
FIG. 3 is detailed a block diagram of a multiplexer and amplification and filtering structure of an ASIC of FIG. 2.

In the embodiment of FIG. 2, an ASIC with its own multiplexer and amplification and filter structure is provided for each frequency F1 and F2 and each axis X and Y. Thus, an ASIC 40 has a multiplexer 42 and amplification and filter structure 44 to provide XF1 to the controller 20'. An ASIC 46 has a multiplexer 48 and amplification and filter structure 50 to provide YF1 to the controller 20'. An ASIC 52 has a multiplexer 54 and amplification and filter structure 56 to provide XF2 to the controller 20'. An ASIC 58 has a multiplexer 60 and amplification and filter structure 62 to provide YF2 to the controller 20'. FIG. 3 shows details of the ASIC 40 having multiplexer 42 and the amplifiers 64, filters 66 and rectifiers and integrators 68 of the amplification and filter structure 44.

This frequency domain solution is also preferred over a time domain solution in that since two separate frequencies are used, the performance of the system will be essentially equivalent to a single frequency system. In an alternate time based solution, a single frequency would be used, but the individual pens would be identified via some communications scheme so that multiple pens could communicate with the controller in different time slots. As two or more pens are added, performance can be impacted, which is why the frequency domain approach is preferred.

In a classroom or conference room, the dual pen interactive whiteboard system 10 allows two students to write and manipulate imagery on the whiteboard 12 simultaneously. For dual pen support, program software resident on a connected computer (not shown) would support the dual user implementation. It is also possible that F1 and F2 could be uniquely identified and properties provided for control and editing purposes. The program software could allow students to work in the same area of the whiteboard display or could let the teacher assign each student to a separate portion of the display area. The computer can be connected to the controller 20 via an interface 38 such as a USB, RS-232, Bluetooth, RF or by other methods.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. An electromagnetic interactive whiteboard system comprising:
   a first electronic pen constructed and arranged to operate at a first frequency,
   at least a second electronic pen constructed and arranged to operate at a second frequency that is different from the first frequency,
   an electromagnetic interactive whiteboard having a single conductive grid, the grid being constructed and arranged to receive electromagnetic signals from the pens due to proximity of the pens to the grid,
   means for separating the first and second frequencies into their respective X and Y component frequencies when the pens are operating simultaneously, and
   a controller constructed and arranged to receive a signal including the separated X and Y component frequencies of each of the first and second pens to detect each pen and to determine an X and Y coordinate position of each pen relative to the grid based on the X and Y component frequencies.

2. The system of claim 1, wherein the means for separating is at least one Application Specific Integrated Circuit (ASIC).

3. The system of claim 2, wherein the at least one ASIC includes a first multiplexer associated with the X component frequencies and a second multiplexer associated with the Y component frequencies.

4. The system of claim 3, wherein the ASIC further includes amplification and filtering structures that cause the separation of the first and second frequencies into their respective X and Y component frequencies.

5. The system of claim 2, wherein four ASICs are provided, one ASIC for each X and Y component frequencies for the first frequency and one ASIC for each X and Y component frequency of the second frequency.

6. The system of claim 5, wherein each ASIC includes an amplification and filtering structure that causes the separation of the first and second frequencies into their respective X and Y component frequencies.

7. The system of claim 1, wherein the controller includes a first circuit constructed and arranged to convert the X and Y component frequencies associated with the first pen to the X and Y coordinate position of the first pen, and at least a second circuit constructed and arranged to convert the X and Y component frequencies associated with the second pen to the X and Y coordinate position of the second pen.

8. The system of claim 1, wherein one of the pens includes a visual indicator to differentiate the one pen from the other pen.

9. An electromagnetic interactive whiteboard system comprising:
- a first electronic pen constructed and arranged to operate at a first frequency,
- at least a second electronic pen constructed and arranged to operate at a second frequency that is different from the first frequency,
- an electromagnetic digitizer having a single conductive grid, the grid being constructed and arranged to receive electromagnetic signals from the pens due to proximity of the pens to the grid,
- a circuit constructed and arranged to separate the first and second frequencies into their respective X and Y component frequencies when the pens are operating simultaneously, and
- a controller constructed and arranged to receive a signal including the separated X and Y component frequencies of each of the first and second pens to detect each pen and to determine an X and Y coordinate position of each pen relative to the grid based on the X and Y component frequencies.

10. The system of claim 9, wherein the circuit includes at least one Application Specific Integrated Circuit (ASIC).

11. The system of claim 10, wherein the at least one ASIC includes a first multiplexer associated with the X component frequencies and a second multiplexer associated with the Y component frequencies.

12. The system of claim 11, wherein the ASIC further includes amplification and filtering structures that cause the separation of the first and second frequencies into their respective X and Y component frequencies.

13. The system of claim 10, wherein four ASICs are provided, one ASIC for each X and Y component frequencies for the first frequency and one ASIC for each X and Y component frequency of the second frequency.

14. The system of claim 13, wherein each ASIC includes an amplification and filtering structure that causes the separation of the first and second frequencies into their respective X and Y component frequencies.

15. The system of claim 9, wherein the controller includes a first circuit constructed and arranged to convert the X and Y component frequencies associated with the first pen to an X and Y coordinate position of the first pen, and at least a second circuit constructed and arranged to convert the X and Y component frequencies associated with the second pen to the X and Y coordinate position of the second pen.

16. The system of claim 9, wherein one of the pens includes a visual indicator to differentiate the one pen from the other pen.

17. The system of claim 9, wherein the digitizer is an interactive whiteboard, a graphics tablet or pad.

18. A method of providing an interactive whiteboard system comprising the steps of:
- providing at least first and second electronic pens,
- providing an electromagnetic interactive whiteboard having a single conductive grid, the grid being constructed and arranged to receive electromagnetic signals from the pens due to proximity of pens to the grid, and
- ensuring that a coordinate position of each pen with respect to the grid can be determined while the pens are operating simultaneously.

19. The method of claim 18, wherein the first pen is provided to operate at a first frequency an the second pen is provided to operate at a second frequency that is different from the first frequency, and wherein the ensuring step includes using at least one Application Specific Integrated Circuit to separate the first and second frequencies into their respective X and Y component frequencies and using a controller to receive the separated X and Y component frequencies of each of the first and second pens to detect each pen and to determine an X and Y position of each pen relative to the grid based on the X and Y component frequencies.

* * * * *